United States Patent [19]
Reynolds

[11] Patent Number: 5,715,523
[45] Date of Patent: Feb. 3, 1998

[54] ACCESS CONTROL FOR A FIXED CELLULAR TERMINAL USING A SECONDARY POWER SOURCE

[75] Inventor: Kevin Reynolds, Plano, Tex.

[73] Assignee: MCI Corporation, Washington, D.C.

[21] Appl. No.: 511,448

[22] Filed: Aug. 4, 1995

[51] Int. Cl.$^6$ ..................................................... H04B 1/40
[52] U.S. Cl. .................... 455/89; 455/343; 379/59
[58] Field of Search ............................ 455/89, 127, 343, 455/54.1, 33.1, 38.3, 186.1; 379/58, 59, 62–63; 340/825.31, 825.34

[56] References Cited

U.S. PATENT DOCUMENTS 4,940,975  7/1990  Ide et al. ................................... 455/343

FOREIGN PATENT DOCUMENTS 1-81543  3/1989  Japan .

*Primary Examiner*—Nguyen Vo

[57] ABSTRACT

Access control is provided for a fixed cellular terminal using a secondary power source. Upon detecting an interruption of power from a primary power source, a signal is provided to reset a non-volatile memory in the fixed cellular terminal to erase a password previously stored in the memory. A secondary power source supplies power for these functions. Upon the memory reset, a subscriber must again enter a password to use the fixed cellular terminal for gaining access to a radio network. Another embodiment of the invention includes a timer for triggering a timing interval after interruption of the primary power is detected. The memory is reset only if the timing interval expires while the primary power is still below the threshold operating level. In yet another embodiment of the invention, a microprocessor determines whether a call is in progress. The memory is reset only if the call is not in progress when the timing interval expires while the primary power is still below the threshold operating level. If the call is in progress under these conditions, then the reset occurs at the termination of the call.

7 Claims, 4 Drawing Sheets

ACCESS CONTROL FOR A FIXED CELLULAR TERMINAL USING A SECONDARY POWER SOURCE

FIELD OF THE INVENTION

This invention relates to telephonic communications and, in particular, a fixed cellular terminal with a secondary power source for controlling unauthorized use of that terminal.

BACKGROUND OF THE INVENTION

Typically, a cellular terminal (telephone), operating over the wireless medium, has its own internal power source such as a nickel cadmium battery which fits directly over the unit. Since the terminal is not attached to an external power source, it is easily transportable over great distances providing great appeal to many consumers due to its portability.

There is another type of a cellular terminal which has its power supplied from an outside source. This type of telephone, known as a fixed cellular terminal, may look like a conventional wireline telephone except that the voice communication is carried over the air via radio frequency (RF) spectrum typically in 800–900 MHz and 1700–2200 MHz range, as opposed to wires used in the conventional wireline service.

In the emerging countries, installation and maintenance of a telephone service is probably one of the most expensive and difficult endeavors. Great effort must be expended for laying wires and creating terrestrial switching circuits across big cities as well as small towns. In a densely populated metropolitan area, for example, displacement and interruption of businesses has to be endured for a considerable length of time to put the telephone wires in place in a cramp setting. In sparsely populated rural areas, on the other hand, the construction may proceed much faster than in a city because the disruption of business and residential operations is minimal. From the economic standpoint, however, the cost of expansive wire installations is very steep in rural areas and may not be recouped for many years because of low density of subscribers. Therefore, availability of the wireline telephone service for rural subscribers may be cost prohibitive in the emerging economy.

To avoid the above problems associated with the traditional wireline telephone service, a cellular telephone network provided a solution for data transmission via wireless medium. According to the cellular technology, the metropolitan area, for example, is divided into blocks or cells. Each cell has a transmitter and a receiver, as well as a tower, for communicating with individual subscribers via cellular terminals.

Much cheaper to install than the wireline network, the cellular network coupled with fixed cellular terminals used by the subscribers provides an easy access to the telephone service for a large segment of population in the developing countries. FIG. 1 shows a diagram of a cellular network with typical fixed terminals used by two parties, i.e., the calling party and the called party.

The fixed cellular terminals may have either a mandatory or optional password—an alphanumeric sequence of characters, numbers and/or symbols generated at the subscriber's keyboard—to access the unit and the radio network. In either case, the password may be entered, for example, when a fixed cellular terminal is first activated via an external power source. After the initial entry, the password is written into a non-volatile Random Access Memory (RAM) or Electronically Programmable Read-Only Memory (EPROM), for example, to be stored for subsequent automatic recall. Thus, after the initial power-up sequence, the subscriber does not have to enter a password every time he or she wants to use the telephone.

Such a fixed cellular terminal, however, presents an easy target for thieves who can steal it and in a short time make many unauthorized calls resulting in a loss to the subscriber and/or the cellular carrier. A secure alternative procedure of entering a password before each use of the telephone is quite cumbersome and would significantly inconvenience the subscribers.

A need, therefore, exists for controlling access to a fixed cellular terminal without undue inconvenience for a subscriber.

SUMMARY OF THE INVENTION

It is an object of the invention to control access to a fixed cellular terminal.

It is another object of the invention to control access to a fixed cellular terminal which requires minor and inexpensive modifications to the terminal.

It is yet another object of the invention to provide a secure access to a fixed cellular terminal without unduly inconveniencing a subscriber.

These and other objects, features and advantages are accomplished by the present invention.

In accordance with one embodiment of the present invention, access to a fixed cellular terminal is controlled using a secondary power source. The present invention comprises detecting means which are located in the fixed cellular terminal for detecting a DC power level supplied by a primary source. The secondary power source supplies secondary power if the DC power level, provided by the primary power source, falls below a predetermined threshold level, as detected by the detecting means. In response to the secondary power source, reset means are activated which are located in the fixed cellular terminal. The reset means provide a signal for resetting a non-volatile memory in the fixed cellular terminal if the DC power level is below the predetermined threshold level. Upon memory reset, a password is required to use the fixed cellular terminal for accessing a radio network.

In another embodiment of the present invention, timing means are located in the fixed cellular terminal for activating a timing interval upon the DC power level falling below the predetermined threshold level. The non-volatile memory is reset only if the timing interval expires while the DC power level is below the predetermined threshold level.

In yet another embodiment of the present invention, processing means, located in the fixed cellular terminal, determine whether a telephone call is in progress. The non-volatile memory is reset only upon completion of the telephone call if the telephone call is in progress after the timing interval expires while the DC power level is below the predetermined threshold level.

BRIEF DESCRIPTION OF THE DRAWINGS

The above-mentioned advantages of the present invention will be more clearly understood when considered in conjunction with the accompanying drawings, in which.

In all Figures, like reference numerals represent the same or identical components of the present invention.

DESCRIPTION OF THE PREFERRED EMBODIMENTS

Figure 1:
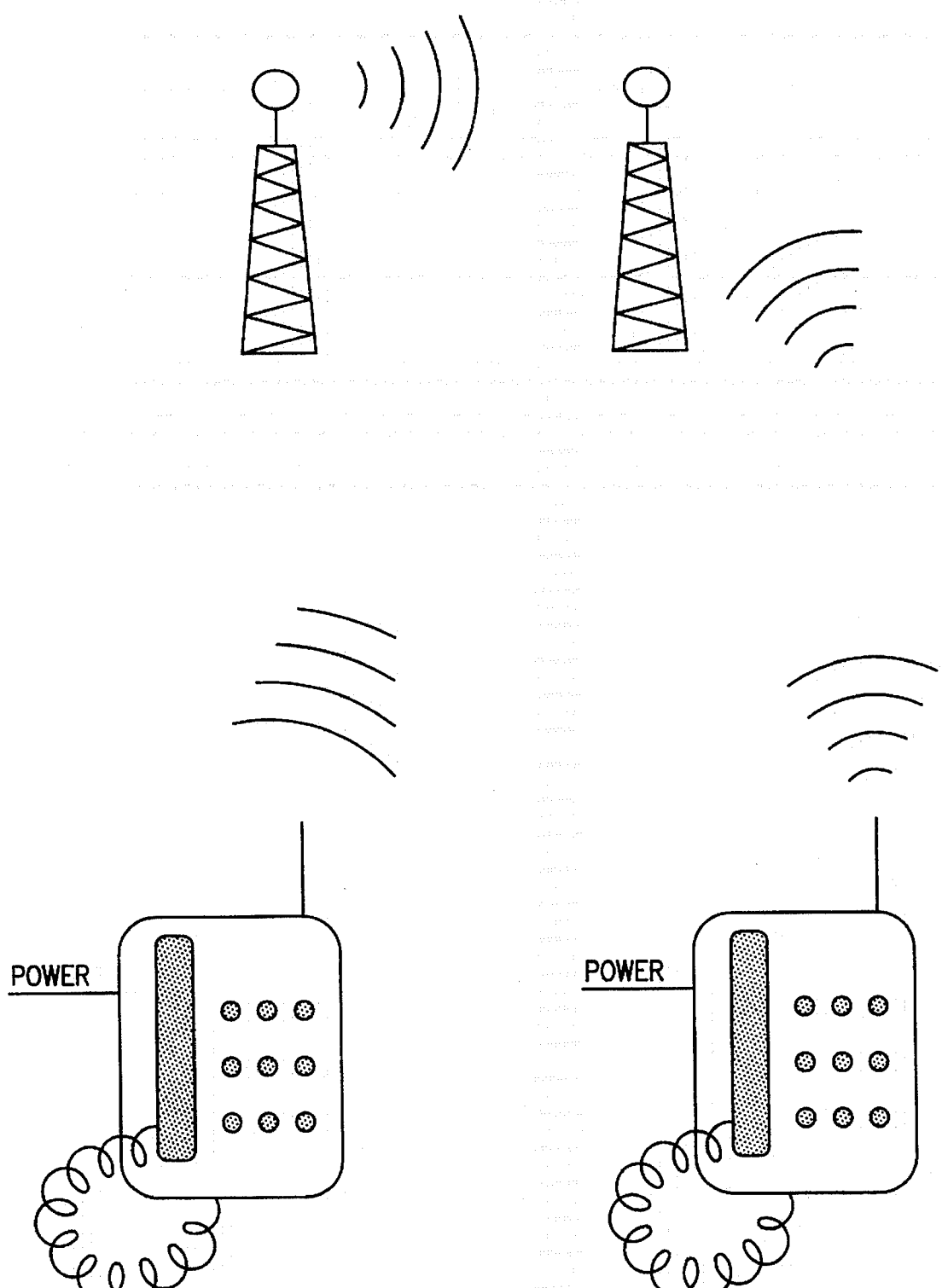
FIG. 1 shows a diagram of a cellular network with regular fixed terminals used by two parties, i.e., the calling party and the called party.
Figure 2:
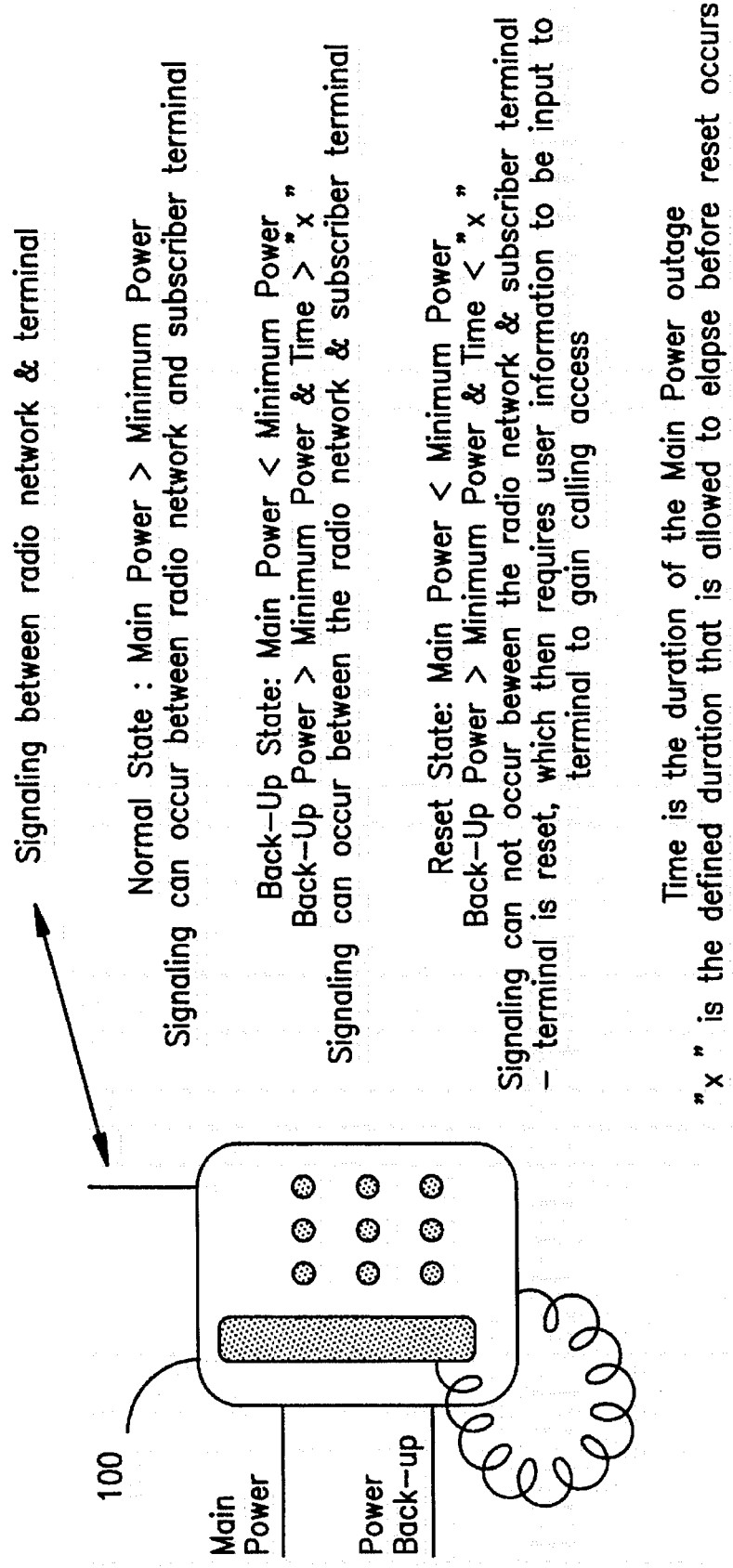
FIG. 2 shows various states of a fixed cellular terminal 100 in accordance with the present invention.

As a general overview, the present invention will be described with reference to FIG. 2 which shows various states of a fixed cellular terminal 100 having two power sources: main and secondary (back-up). In a normal state, the main power source is greater than a predetermined threshold minimum power level required for proper operation of components within the terminal 100. In this state, signaling can occur between the radio network and the terminal 100 as indicated in FIG. 2.

When the main power source is interrupted, as for example when a thief unplugs the fixed cellular terminal 100 from a wall outlet, the interruption of the power source is detected in accordance with the present invention. Further in accordance with the present invention, the secondary power source provides back up power for the operation of the fixed cellular terminal. Upon detecting the interruption of the main power source, a timing device is simultaneously triggered to measure elapsed time from the beginning of the main power source interruption. If the elapsed time does not exceed time "x" of predetermined duration during the operation of the back-up power source, i.e., the back-up power level is greater than the threshold minimum power level and the time is less than "x", then signaling can occur between the radio network and the terminal 100 which is in a back-up state.

If, however, the predetermined time "x" elapses while the back-up power level is greater than the threshold minimum power level, the fixed cellular terminal 100 transitions into a reset state where it is reset. The next time a subscriber wants to use the fixed cellular terminal 100, a power up sequence would commence requiring the subscriber to enter a password for gaining calling access to the terminal 100. According to the present invention, the time interval safeguards against unnecessarily inconveniencing subscribers by resetting the terminal due to transient changes in power levels.

Figure 3:
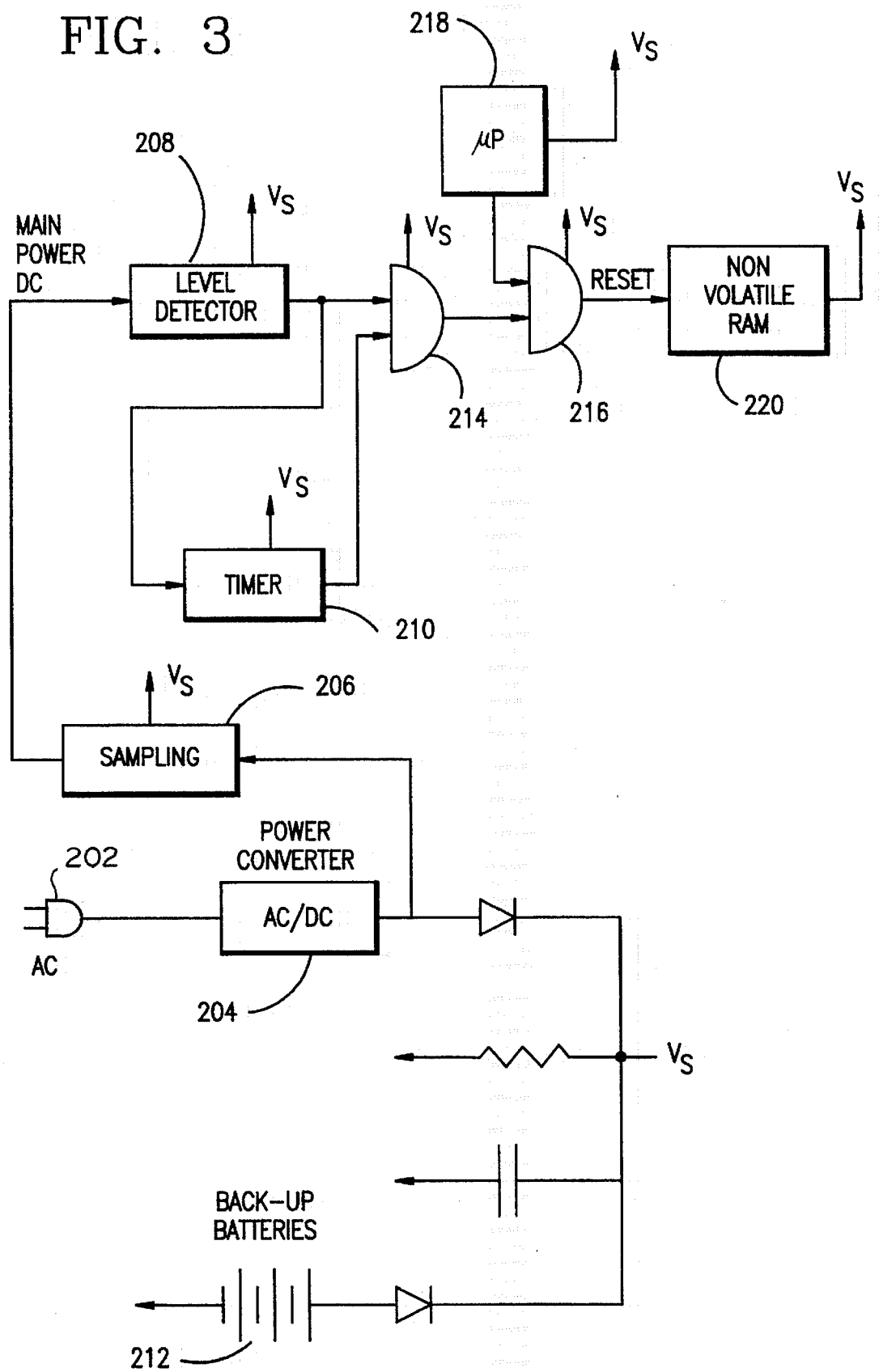
FIG. 3 shows a block diagram of a circuit in the fixed cellular terminal 100 according to one embodiment of the present invention.

FIG. 3 shows a block diagram of a circuit in the fixed cellular terminal 100 according to one embodiment of the present invention. The particular embodiment will be described in detail with reference to FIG. 3.

Thus, in accordance with FIG. 3, an external AC power source 202 supplies AC voltage and current to the fixed cellular terminal 100. Located inside the terminal 100, a power converter 204, such as a step-down transformer and a full-wave rectifier for example, converts AC current and voltage into a regulated DC current and voltage suitable for providing power, designating as $V_s$, to electronic components in the fixed cellular terminal 100 as known to persons skilled in the art.

In addition to the AC power source 202, a DC back-up battery 212 provides a back up power to the electronic components in the fixed cellular terminal 100. The two parallel-connected power sources 202 and 212 do not conflict with each other due to front-to-front diodes connected in series with each power source. Other configurations, however, are possible for separating power sources as known to a person skilled in the art.

Further according to FIG. 3, a sampling device 206 samples the rectified and regulated DC current at a suitable sampling rate to generate digital samples in accordance with one embodiment of the present invention. Alternatively, the sampling function may not be performed by a separate component but instead can be integrated into a power level detector 208.

Regardless of the implementation of the sampling function, digital samples are monitored by the power level detector 208 and counted by the timer 210. As the power level detector 208 detects current or voltage falling below a predetermined signal level, an active output signal is generated by the power level detector 208. In the particular embodiment of the present invention in accordance with FIG. 3, the active output signal is a logical one (1). The present invention, however, is not limited to a logical one (1) being the active output signal, and in another embodiment the active output signal may be a logical zero (0), provided the corresponding change is implemented in logic gates receiving the output signal from the power level detector 208.

When the power level detector 208 detects input power level below the threshold level, it also outputs the active signal to the timer 210. This signal triggers the timer 210 to start counting for a predetermined duration period, such as five (5) seconds for example. When the timer 210 expires, it sends an active output signal to an AND gate 214.

The AND gate 214 has two inputs: one from the power level detector 208 and the other from the timer 210. According to the operation of an AND gate, two simultaneous active input signals produce an active output signal. Thus, if the power level detector 208 still detects signal level below the threshold level, thereby generating the active signal, while the timer 210 times out, two active signals are provided to the input of the AND gate 214. The AND gate 214 then produces an active output signal which serves as an input signal to a second AND gate 216.

The second AND gate 216 has one input signal from the first AND gate 214 and another input signal coming from a microprocessor 218. The microprocessor 218 is typically present in the fixed cellular terminal to control its operation. The microprocessor 218 monitors the telephone call and determines when it is in progress. When the call is not in progress and the output from the first AND gate 214 is active, then both inputs to the second AND gate 216 are active. The second AND gate 216 then generates an active output signal to a non-volatile RAM memory 220 or other erasable memory as known in the art. The active output signal from the second AND gate resets the non-volatile RAM memory 220 requiring the user to enter an access code to operate the fixed cellular terminal. If, however, the call is in progress when the output from the first AND gate 214 is active, the microprocessor 218 then waits until the call is terminated to output the active signal.

Waiting for the termination of a call is one embodiment of the present invention. It is apparent that in another embodiment of the invention, the output signal from the microprocessor 218 may be set to an active status regardless of whether the call is in progress. The reset of the fixed terminal 100 will then occur as soon as both the power level detector 208 and the timer 210 output active signals irrespective of the call in progress.

Another variation of the present invention is the output of the timer 210. If the timer 210 is set to output an active signal without any time interval duration, then the fixed terminal 100 will be reset as soon as the power level detector 208 detects the main power source to be below the threshold signal level. A subscriber would have to enter a password or access code to establish signaling between the terminal 100 and radio network.

Figure 4:
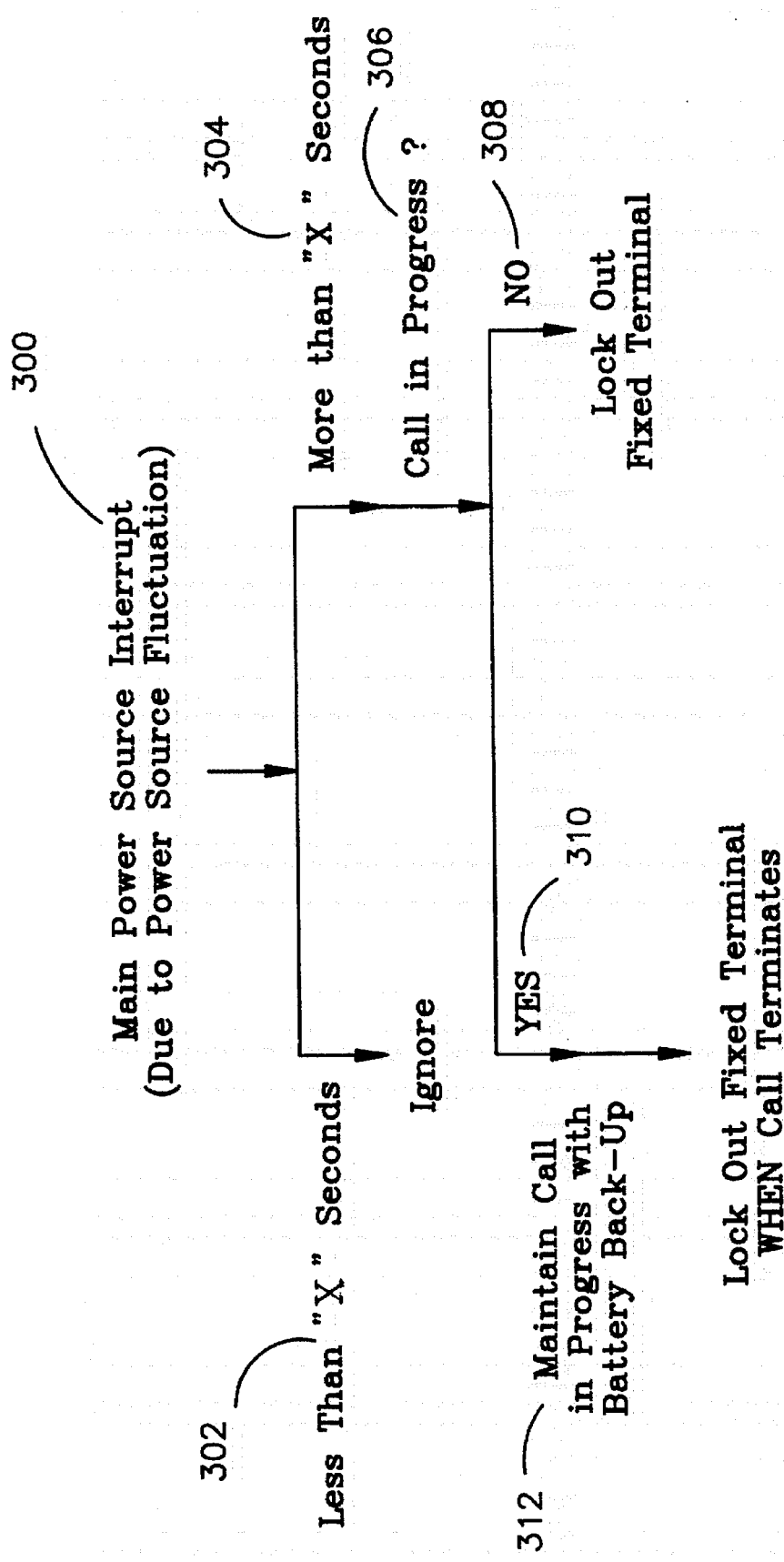
FIG. 4 shows sequencing steps in accordance with one embodiment of the present invention.

FIG. 4 shows sequencing steps in accordance with one embodiment of the present invention. In step 300, the main power source is interrupted due to power source fluctuation. The interruption of the power source is detected, and then a decision is made on the elapsed time. Step 302 shows that the power source was interrupted for less than "x" seconds, where "x" is a predetermined time interval. In this case, the power source interruption is ignored, and the normal operation of the fixed cellular terminal 100 continues.

If, however, it is determined that the time interval "x" has been exceeded while the main power source is interrupted as shown in step 304, then another decision is made in step 306: whether the call is in progress. If the call is not in progress (step 308), the fixed cellular terminal 100 is locked out or reset as shown in FIG. 4. On the other hand, if the call is in progress (step 310), then in step 312 the call is maintained with the back-up power source until the call is terminated. After the termination, the fixed cellular terminal 100 is reset requiring the subscriber's password to gain access.

Since those skilled in the art can modify the disclosed specific embodiment without departing from the spirit of the invention, it is, therefore, intended that the claims be interpreted to cover such modifications and equivalents.

What is claimed is:

1. A device for controlling access to a fixed cellular terminal using a wireless medium, comprising:

detecting means located in said fixed cellular terminal for monitoring the level of power supplied by a primary power source to said fixed cellular terminal;

a secondary power source for supplying power to said fixed cellular terminal if said level of power from said primary power source falls below a predetermined threshold level; and reset means located in said fixed cellular terminal for resetting a memory means in said fixed cellular terminal if said level of power falls below said predetermined threshold level so that a password is required to be input to said memory means before said fixed cellular terminal can further be used.

2. The device according to claim 1, further comprising:

timing means for activating a timing interval when said level of power falls below said predetermined threshold level, said memory means being reset only if said timing interval expires while said level of power remains below said predetermined threshold level.

3. The device according to claim 2, further comprising:

processing means for determining whether a telephone call is in progress, said memory means being reset only upon completion of said telephone call if said telephone call is in progress after said timing interval expires and said level of power remains below said predetermined threshold level.

4. A device for controlling access to a fixed cellular terminal, comprising:

a secondary power source for providing power to said fixed cellular terminal if the level of power from a primary power source falls below a predetermined threshold level;

power converter means for converting input power from said primary power source to a level suitable for operation of electronic components in said fixed cellular terminal;

sampling means for receiving an analog signal output from said power converter means and converting said analog signal to a counterpart digital signal;

level detecting means for monitoring said counterpart digital signal, said counterpart digital signal being indicative of the level of power supplied by said primary power source to said fixed cellular terminal;

timing means for activating a timing interval upon receipt of an output signal from said level detecting means;

a first AND gate for receiving said output signal from said level detecting means and another signal from said timing means, said first AND gate outputting a signal only when both of the signals received thereby indicate an active state;

a second AND gate for receiving said signal output from said first AND gate and another signal from a processing means, said processing means determining whether a telephone call is in progress, said second AND gate outputting a reset signal when both of the signals received thereby indicate an active state; and memory means coupled to said second AND gate for receiving said reset signal to erase a password previously stored therein if said level of power is below said predetermined threshold level;

wherein said memory needs to have reinput thereinto said password or another password before said fixed cellular terminal can again be operational.

5. A method of controlling access to a fixed cellular terminal, comprising the steps of:

detecting the level of power supplied by a primary power source to said fixed cellular terminal;

supplying power to said fixed cellular terminal from a secondary power source if said level of power from said primary power source falls below a predetermined threshold level;

thereafter resetting a memory means in said fixed cellular terminal to erase a password previously stored in said memory means; and requiring the input of said password to said memory means before permitting further use of said fixed cellular terminal.

6. The method according to claim 5, further comprising the steps of:

activating a timing interval when said level of power falls below said predetermined threshold level; and resetting said memory means only if said timing interval expires and said level of power remains below said predetermined threshold level.

7. The method according to claim 6, further comprising the steps of:

determining whether a telephone call is in progress; and upon completion of said telephone call if said telephone call is in progress, resetting said memory means only after said timing interval expires and said level of power remains below said predetermined threshold level.

* * * * *